United States Patent
Wang et al.

(10) Patent No.: US 11,449,570 B2
(45) Date of Patent: Sep. 20, 2022

(54) DATA CACHING METHOD AND APPARATUS

(71) Applicant: ANT WEALTH (SHANGHAI) FINANCIAL INFORMATION SERVICES CO., LTD., Shanghai (CN)

(72) Inventors: Lingyu Wang, Hangzhou (CN); Yamin Li, Hangzhou (CN)

(73) Assignee: ANT WEALTH (SHANGHAI) FINANCIAL INFORMATION SERVICES CO., LTD., Shanghai (CN)

(*) Notice: Subject to any disclaimer, the term of this patent is extended or adjusted under 35 U.S.C. 154(b) by 663 days.

(21) Appl. No.: 16/145,660

(22) Filed: Sep. 28, 2018

(65) Prior Publication Data

US 2019/0034550 A1 Jan. 31, 2019

Related U.S. Application Data

(63) Continuation of application No. PCT/CN2017/077241, filed on Mar. 20, 2017.

(30) Foreign Application Priority Data

Apr. 1, 2016 (CN) .......................... 201610204539.8

(51) Int. Cl.
*G06F 16/957* (2019.01)
*G06F 16/00* (2019.01)

(52) U.S. Cl.
CPC .......... *G06F 16/9574* (2019.01); *G06F 16/00* (2019.01)

(58) Field of Classification Search
CPC .............................. G06F 16/9574; G06F 16/00
See application file for complete search history.

(56) References Cited

U.S. PATENT DOCUMENTS

| | | |
|---|---|---|
| 5,897,634 A | 5/1999 | Attaluri et al. |
| 6,182,122 B1 | 1/2001 | Berstis |
| 6,934,699 B1 | 8/2005 | Haas et al. |
| 7,801,913 B2 | 9/2010 | Shrivastava et al. |
| 8,060,486 B2 | 11/2011 | Chatterjee et al. |
| 8,296,394 B1 | 10/2012 | Asher |
| 8,539,160 B2 | 9/2013 | Gallagher |
| 8,886,671 B1 | 11/2014 | Ro et al. |

(Continued)

FOREIGN PATENT DOCUMENTS

| | | |
|---|---|---|
| CN | 103853671 A | 6/2014 |
| CN | 105138587 A | 12/2015 |

(Continued)

OTHER PUBLICATIONS

Gopalan et al. "Caching with Expiration Times", p. 540-547 (Year: 2002).*

(Continued)

*Primary Examiner* — Mark D Featherstone
*Assistant Examiner* — Kweku William Halm

(57) ABSTRACT

A data caching method comprises: after receiving a data request sent by a client, determining a remaining valid cache duration of cache data corresponding to the data request; determining whether the remaining valid cache duration is greater than a preset update threshold value; and if the remaining valid cache duration is less than or equal to the update threshold value, updating the cache data through a database.

12 Claims, 3 Drawing Sheets

(56) References Cited

U.S. PATENT DOCUMENTS

| | | |
|---|---|---|
| 9,235,531 B2 | 1/2016 | Celis et al. |
| 9,621,405 B2 | 4/2017 | Chaudhry et al. |
| 9,747,288 B1 | 8/2017 | Beckford et al. |
| 9,876,873 B1 | 1/2018 | Teague et al. |
| 2003/0221068 A1* | 11/2003 | Tsuji .................... G06F 16/284 711/126 |
| 2004/0205053 A1 | 10/2004 | Bird et al. |
| 2005/0165807 A1 | 7/2005 | Srinivasan et al. |
| 2005/0262059 A1 | 11/2005 | White |
| 2008/0046655 A1* | 2/2008 | Bhanoo .................. H04L 67/28 711/133 |
| 2008/0098093 A1 | 4/2008 | Simon et al. |
| 2010/0306444 A1 | 12/2010 | Shirley et al. |
| 2011/0060881 A1 | 3/2011 | Gallagher |
| 2011/0078120 A1 | 3/2011 | Tyhurst et al. |
| 2011/0125901 A1 | 5/2011 | Heim |
| 2011/0173395 A1 | 7/2011 | Bhattacharjee et al. |
| 2011/0320552 A1 | 12/2011 | Friedman et al. |
| 2012/0166419 A1 | 6/2012 | Enoki et al. |
| 2012/0221768 A1 | 8/2012 | Bagal et al. |
| 2013/0024421 A1 | 1/2013 | Shinohara |
| 2013/0339472 A1* | 12/2013 | Ruellan ............... H04L 67/2842 709/214 |
| 2014/0129781 A1 | 5/2014 | Musumeci et al. |
| 2014/0297954 A1* | 10/2014 | Clevenger .......... G06F 16/9574 711/118 |

FOREIGN PATENT DOCUMENTS

| | | |
|---|---|---|
| CN | 105335512 A | 2/2016 |
| JP | 2010-501941 A | 1/2010 |
| JP | 2011-186903 A | 9/2011 |
| TW | 364086 B | 7/1999 |
| TW | 201145044 A | 12/2011 |

OTHER PUBLICATIONS

International Search Report and Written Opinion for Application No. PCT/CN2017/077241, dated Jun. 21, 2017, 8 pages.

International Preliminary Report on Patentability Chapter I for Application No. PCT/CN2017/077241 dated Oct. 11, 2018 (11 pages).

Search Report for European Application No. 17773069.4 dated Oct. 4, 2019 (10 pages).

Partial Supplementary European Search Report for European Application No. 17773069.4 dated Jun. 27, 2019 (11 pages).

Office Action and Search Report for Taiwanese Application No. 106107620 dated Dec. 21, 2018 (7 pages).

Office Action for Taiwanese Application No. 106107620 dated Jan. 28, 2019 (2 pages).

Office Action for Korean Application No. 10-2018-7031539 dated Mar. 28, 2020.

Office Action for Indonesian Application No. PID201807519 dated Apr. 13, 2020.

Office Action for Japanese Application No. 2018-551171 dated Apr. 14, 2020.

Second Office Action for Chinese Application No. 201610204539.8 dated May 18, 2020.

Office Action for Japanese Application No. 2018-551171 dated Jan. 14, 2020.

First Search Report for Chinese Application No. 201610204539.8 dated Jan. 19, 2020.

* cited by examiner

DATA CACHING METHOD AND APPARATUS

CROSS REFERENCE TO RELATED APPLICATIONS

The present application is a continuation application of the International Patent Application No. PCT/CN2017/077241, filed on Mar. 20, 2017, and titled "Data Caching Method and Apparatus." The PCT Application PCT/CN2017/077241 claims priority to the Chinese Patent Application No. 201610204539.8 filed on Apr. 1, 2016 and entitled "Data Caching Method and Apparatus." The entire contents of all of the above applications are incorporated herein by reference in their entirety.

TECHNICAL FIELD

The present description relates to the field of Internet technologies, and in particular, to data caching methods and apparatuses.

BACKGROUND

In exemplary applications, tens of thousands of users access the same page of a large website or application almost every second. To rapidly respond to user requests, caching technologies have been introduced. When a page is accessed for the first time in current technologies, a system first searches a database for data corresponding to the page, then returns the obtained data to a client, and at the same time, caches the obtained data to a cache server, such that the data can be directly obtained from the cache server side when the page is accessed again later, obviating of the remarkable time spent on querying the database with a great amount of data, and thereby improving the efficiency of responding to user requests.

Since data in a database is constantly updated, the data cached to a cache server is only cached temporarily, rather than permanently. In such case, if a great number of users access a page while the cache data of the page has expired, the system needs to respectively search for data in the database for each request. Therefore, there can be a great number of requests accessing the database at the same time, the efficiency of querying data from the database is low, and the number of connections to the database is limited. As a result, some users' interfaces may experience brief system anomalies and failure to view page contents.

SUMMARY

In view of the above, the present disclosure provides data caching methods and apparatuses, which can solve the following problems: when a great number of users access a page but cache data the page has expired, it is necessary to respectively search for data in a database for each request, resulting in the issue of having a large number of requests access the database at the same time, causing some users' interfaces to experience brief system anomalies and failure to view page contents.

According to one aspect, a data caching method is provided, and the method comprises: after receiving a data request sent by a client, determining a remaining valid cache duration of cache data corresponding to the data request; determining whether the remaining valid cache duration is greater than a preset update threshold value; and if the remaining valid cache duration is less than or equal to the update threshold value, updating the cache data through a database.

In some embodiments, the method further comprises: if another data request is received during an update period of the cache data, cancelling the determination of whether the remaining valid cache duration is greater than the preset update threshold value.

In some embodiments, the method further comprises: when the cache data expires, checking whether another data request sent by a client and corresponding to the cache data is received; if no data request sent by the client and corresponding to the cache data is received, updating the cache data through the database; and if the another data request sent by the client and corresponding to the cache data is received, searching the database for data corresponding to the data request, returning obtained data to the client, and updating the cache data based on the obtained data.

In some embodiments, the method further comprises: when a data resource is accessed for a first time, dividing data comprised in the data resource into at least two data sets according to a resource type and a preset rule, wherein the access request is a request to access the data resource; and separately caching each of the data sets and generating a key corresponding to each of the data sets, causing the cache data to be searched subsequently based on the keys, wherein each of the data sets has a different expiration time point.

In some embodiments, the dividing data comprised in the data resource into at least two data sets according to a resource type and a preset rule comprises: when the data resource is a first page for presenting fixed data, dividing the data comprised in the first page and obtained from the database into the at least two data sets according to the page layout of the first page.

In some embodiments, the dividing data comprised in the data resource into at least two data sets according to a resource type and a preset rule comprises: when the data resource is a second page having a condition query function, dividing the data comprised in the second page and obtained from the database into the at least two data sets according to a combination of query conditions that the second page involves, wherein the second page comprises a plurality of sets of query conditions each comprising at least one query condition.

In some embodiments, the determination of whether the remaining valid cache duration is greater than a preset update threshold value comprises: determining whether the remaining valid cache duration of a data set corresponding to the data request and among the data sets is greater than the update threshold value.

According to another aspect, a data caching apparatus is provided, and the apparatus comprises: a confirming unit configured to, after receiving a data request sent by a client, determine a remaining valid cache duration of cache data corresponding to the data request; a determining unit configured to determine whether the remaining valid cache duration obtained by the confirming unit is greater than a preset update threshold value; and an updating unit configured to, if a determination result of the determining unit is that the remaining valid cache duration is less than or equal to the update threshold value, update the cache data through a database.

According to another aspect, a data caching apparatus, comprising: a processor and a non-transitory computer-readable storage medium storing instructions that, when executed by the processor, cause the processor to perform a data caching method, the method comprising: after receiving a data request sent by a client, determining a remaining valid cache duration of cache data corresponding to the data request; determining whether the remaining valid cache duration is greater than a preset update threshold value; and if the remaining valid cache duration is less than or equal to the update threshold value, updating the cache data through a database.

According to another aspect, a non-transitory computer-readable storage medium storing instructions that, when executed by a processor, cause the processor to perform a data caching method, the method comprising: after receiving a data request sent by a client, determining a remaining valid cache duration of cache data corresponding to the data request; determining whether the remaining valid cache duration is greater than a preset update threshold value; and if the remaining valid cache duration is less than or equal to the update threshold value, updating the cache data through a database.

With the above technical solutions, the data caching methods and apparatuses according to the present disclosure are capable of determining, after receiving a data request sent by a client, whether a remaining valid cache duration of cache data corresponding to the data request is greater than a preset update threshold value; when the remaining valid cache duration is greater than the update threshold value, directly returning the cache data to the client; and when the remaining valid cache duration is a positive number and less than or equal to the update threshold value, returning the cache data to the client and further updating the cache data through a database. Relative to current technologies where cache data is updated only when the cache data expires, therefore, the present disclosure can update cache data before the cache data expires. When a large number of clients subsequently request the cache data, the cache data is still in a valid state, and the cache data can be directly returned to each of the clients, thereby mitigating the issue of having a large number of requests access the database in parallel due to expired cache data.

The description above is merely a summary of the technical solutions of the present disclosure. To enable a clearer understanding of technical means of the present disclosure and implementations according to the description, and to make the above and other objectives, features, and advantages of the present disclosure more comprehensible, implementation manners of the present disclosure will be described below.

BRIEF DESCRIPTION OF THE DRAWINGS

Various other benefits and advantages of the present disclosure will become clear to a person skilled in the art with reference to the detailed description of implementation manners below. The accompanying drawings are used only for the purpose of illustrating the implementation manners below and may not be construed as limitations to the present disclosure. In the accompanying drawings, moreover, identical reference symbols are used to represent identical parts. In the accompanying drawings.

DETAILED DESCRIPTION

Exemplary embodiments of the present disclosure will be further described in detail below with reference to the accompanying drawings. Although the accompanying drawings illustrate the exemplary embodiments of the present disclosure, the present disclosure may be implemented in various manners and not be limited by the embodiments described herein. These embodiments are provided to enable a more thorough understanding of the present disclosure and to convey the complete scope of the present disclosure to those skilled in the art.

Figure 1:
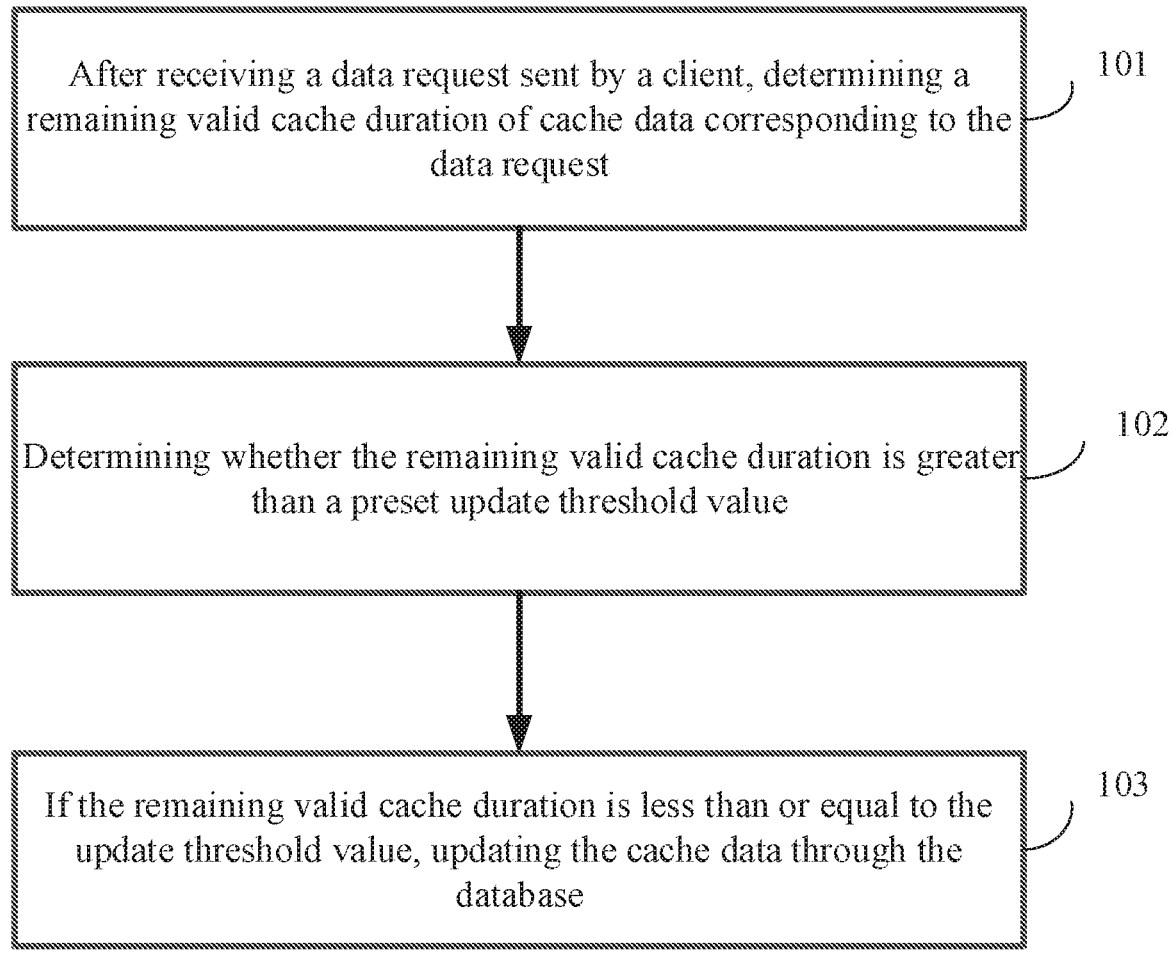
FIG. 1 is a flow chart of a data caching method according to some embodiments of the present disclosure.

Some embodiments of the present disclosure provide a data caching method that is mainly applied at a server side. As shown in FIG. 1, the method mainly comprises:

Step 101. After receiving a data request sent by a client, determining a remaining valid cache duration of cache data corresponding to the data request.

In some embodiments, after a server receives a data request sent by a client, the server may search a cache for cache data corresponding to the data request and determine a remaining valid cache duration of the cache data, so that whether the cache data needs to be updated can be determined later according to the remaining valid cache duration. Here, when each piece of cache data is cached, the caching start time and overall valid cache duration of the piece of cache data can be recorded. When the cache time reaches the overall valid cache duration, the cache data expires. Alternatively, a countdown timer for the overall valid cache duration may be provided. When the count becomes 0, the cache data expires. Therefore, the server can determine a remaining valid cache duration of the cache data according to a time attribute of the cache data.

Step 102. Determining whether the remaining valid cache duration is greater than a preset update threshold value.

In some embodiments, the remaining valid cache duration is a positive number, and the update threshold value is less than the overall valid cache duration of the cache data. If the remaining valid cache duration is a positive number, it shows that the cache data is valid data. In this case, the step 102 can be executed to determine whether it is necessary to update the cache data early; if the remaining valid cache duration is 0, it shows that the cache data expires. In this case, the step 102 is cancelled, data is queried from a database directly with regard to each data request, the obtained data is returned to the client, and the expired cache data is updated according to the obtained data.

Step 103. If the remaining valid cache duration is less than or equal to the update threshold value, updating the cache data through the database.

For example, if the remaining valid cache duration is less than or equal to the update threshold value, the cache data is returned to the client, and the cache data is updated through the database; if the remaining valid cache duration is greater than the update threshold value, the cache data can be directly returned to the client, obviating update to the cache data through the database. Here, returning the cache data to the client and updating the cache data through the database can be performed simultaneously or at different times, which is not limited herein.

If receiving a data request sent by a client when the remaining valid cache duration of cache data is equal to the update threshold value, the server needs to update the cache data through the database. In this case, if the update threshold value is an average time required from querying data in the database to writing the obtained data into the cache, then the update operation is completed right at the instant when the cache data expires. If the update threshold value is less than the average time, the update operation is not completed at the instant when the cache data expires. If a large number of clients send data requests during the period from the expiration of the cache data to the completion of the update operation, then a query request needs to be sent to the database with regard to each data request, which may lead to system anomalies. If the update threshold value is greater than the average time, the update operation is then completed before the cache data expires. Therefore, it is not necessary to send a query request to the database for each data requests due to the expired cache. As a result, if the update threshold value is greater than or equal to the average time required from querying data in the database to writing the obtained data into the cache in an exemplary application, the issue of having a large number of requests access the database can be further mitigated.

With the data caching method according to some embodiments of the present disclosure, after a data request sent by a client is received, it can be determined whether a remaining valid cache duration of cache data corresponding to the data request is greater than a preset update threshold value; when the remaining valid cache duration is greater than the update threshold value, the cache data is directly returned to the client; and when the remaining valid cache duration is a positive number and less than or equal to the update threshold value, the cache data is returned to the client, and moreover, the cache data is updated through a database. Relative to current technologies where cache data is updated only when the cache data expires, therefore, the present disclosure can update cache data before the cache data expires. When a large number of clients subsequently request the cache data, the cache data is still in a valid state, and the cache data can be directly returned to each of the clients, thereby mitigating the issue of having a large number of requests access the database in parallel due to the expired cache data.

Furthermore, a data request sent by a client may be received during the period when the cache data is updated through a database, cache data corresponding to the data request may not expire during this period, and the update condition (i.e., the remaining valid cache duration of the cache data is less than or equal to the update threshold value) is satisfied. Therefore, the cache data always satisfies the update condition when the cache data does not expire and when the cache data is being updated through a database. During this period, whenever a data request corresponding to the cache data is received, it is necessary to send a data query request to the database so as to update the cache data. As a result, a phenomenon occurs that the cache data is updated frequently and the database is accessed frequently.

To solve the above technical problem, some embodiments of the present disclosure can make the following improvements to the above embodiment: if another data request is received during an update period of the cache data, the determination of whether the remaining valid cache duration is greater than the preset update threshold value is no longer executed. Namely, the cache data is updated only when a received data request satisfies the update condition for the first time. When another data request is received before the update is completed, the cache data is directly returned to a corresponding client without having to update the cache data by accessing a database.

Furthermore, for the solution involved in the above embodiment, if no data request corresponding to the cache data is received in the process that the remaining valid cache duration of the cache data changes gradually from the update threshold value to 0 (excluding 0), no operation will be triggered to update the cache data. As a result, the issue of expired cache data still exists, and then it is possible that a large number of requests access the database at the same time. To further mitigate the issue of having a large number of requests access the database in parallel due to the expired cache data, some embodiments of the present disclosure can make the following improvements:

when the cache data expires, checking whether another data request sent by a client and corresponding to the cache data is received; if no data request sent by the client and corresponding to the cache data is received, updating the cache data through the database; if the another data request sent by the client and corresponding to the cache data is received, searching the database for data corresponding to the data request, returning obtained data to the client, and updating the cache data based on the obtained data.

Compared with the determination of whether the cache data needs to be updated only after a data request sent by a client is received, some embodiments of the present disclosure determine in real time whether the stored cache data expires. If no data request sent by a client and corresponding to the cache data is received when the cache data expires, the cache data is directly updated through a database. As a result, if a data request sent by a client is received after the cache data is updated, the updated cache data can be directly returned to the client with no need to access the database for each data request, thereby further mitigating the issue of having a large number of requests access the database at the same time.

Furthermore, some embodiments of the present disclosure can make the following improvements:

when a data resource is accessed for the first time, data comprised in the data resource is divided into at least two data sets according to the resource type and a preset rule. Each data set is cached separately and a key corresponding to each data set is generated, and cache data can be searched subsequently based on the keys, wherein each of the data sets has a different expiration time point, and the key value is a main key value of the cache data. Here, the data resource comprises browser pages, pages on other application software, and files to be downloaded.

In addition, after data comprised in the data resource is divided into at least two data sets and cached, an exemplary implementation manner of the above step 102 can be: determining whether the remaining valid cache duration of a data set corresponding to the data request and among the data sets is greater than the update threshold value.

In an exemplary application, when the data resource is a page, different types of pages can have different page data division methods. The following situations will be used as examples for description:

The first situation: when data comprised in a first page for presenting fixed data is cached in current technologies, all data would be cached completely, i.e., all data comprised in the first page correspond to one key. Therefore, when cached data corresponding to the first page is updated, it is necessary to search the database for all data comprised in the first page. The amount of data to be queries is high and the query efficiency is low. To solve the above technical problem, therefore, some embodiments of the present disclosure can make following divisions on the first page: when the data resource is the first page for presenting fixed data, data comprised in the first page and obtained from the database can be divided into at least two data sets according to the page layout of the first page. When the first page is divided, moreover, the data sets are cached separately and a key corresponding to each data set is generated, and cache data can be searched subsequently based on the keys, wherein each of the data sets has a different expiration time point.

For example, the first page is a page for presenting fixed data. Namely, when a client accesses the first page, a server needs to return all data comprised in the first page to the client, causing the first page to be displayed completely on the client, wherein the fixed data displayed by the first page includes texts, links, images, and the like.

In an exemplary application, one page is often divided into at least two regions for display, and data displayed in the regions often has the same format. Therefore, data comprised in the first page can be divided into at least two data sets according to the page layout, and each data set corresponds to one region of the page layout, or each data set corresponds to a part of one region; alternatively, the first page can be divided according to other division rules, which is not limited herein.

If the data resource is a first page for presenting fixed data and data is cached based on the above first situation, it is necessary to separately determine, when a client requests data of the page, whether the remaining valid cache duration of each data set corresponding to the data request is greater than an update threshold value, and to update a data set having the remaining valid cache duration less than or equal to the update threshold value through the database.

Since each of the data sets has a different expiration time point, it is possible that, at the same moment, only some data sets have the remaining valid cache duration less than or equal to the update threshold value. Compared with a page being completely cached (i.e., all data comprised in the page correspond to one key) in current technologies, therefore, some embodiments of the present disclosure just need to update data sets having the remaining valid cache duration less than or equal to the update threshold value, and do not need to update other data sets corresponding to the page, thereby reducing the data amount required by updating the page data and then improving the update efficiency.

The second situation: when data comprised in a second page having a condition query function is cached in current technologies, all data would be cached completely, i.e., all data comprised in the second page correspond to one key. Therefore, when a user performs condition query based on the second page, it is necessary to search all cache data corresponding to the second page for data satisfying the condition and return the obtained data to a client. Therefore, the efficiency of responding to client requests is low. To solve the above technical problem, some embodiments of the present disclosure can make following divisions on the second page:

when the data resource is the second page having a condition query function, data comprised in the second page and obtained from the database can be divided into at least two data sets according to a combination of query conditions that the second page involves. The second page comprises a plurality of sets of query conditions, result data corresponding to one set of query conditions is a data set, and one set of query conditions comprises at least one query condition. When the second page is divided, moreover, the data sets are cached separately and a key corresponding to each data set is generated, and cache data can be searched subsequently based on the keys.

Here, the second page comprises all query conditions and result data corresponding to one set of query conditions. When a user enters the second page for the first time, query conditions are often not limited, and therefore, all data can be displayed on the page; when the user performs query by selecting a set of query conditions based on the second page, result data corresponding to this set of query conditions can be displayed on the page.

For example, query conditions on the second page comprise: "term (including, but not limited to, within 3 months, between 3-6 months, between 6-12 months)," "minimum purchase amount (including, but not limited to, 100-1000, 1000-10000, 10000-50000, more than 50000)," "product type (including, but not limited to fund products, insurance products, other products)." When a user enters the second page for the first time, the term, minimum purchase amount, and product type are not limited, and all data are displayed; when the user selects "the term is within 3 months, the minimum purchase amount is 10000-50000, and the product type is fund products" based on the second page, the second page will display data that satisfies the condition.

If the data resource is a second page having a condition query function and data is cached based on the above second situation, it is necessary to determine, when a user performs condition query based on the page, whether the remaining valid cache duration of the data set corresponding to the set of query conditions is greater than an update threshold value, and to update the data set through the database when the remaining valid cache duration is less than or equal to the update threshold value.

Since data sets corresponding to the sets of query conditions are cached separately, a data set under a query condition can be searched directly through a key when the user performs condition query based on the page, and the obtained data set is returned to a client without having to perform secondary query according to the query condition in all data comprised in the page, thereby improving the efficiency of responding to client requests.

Figure 2:
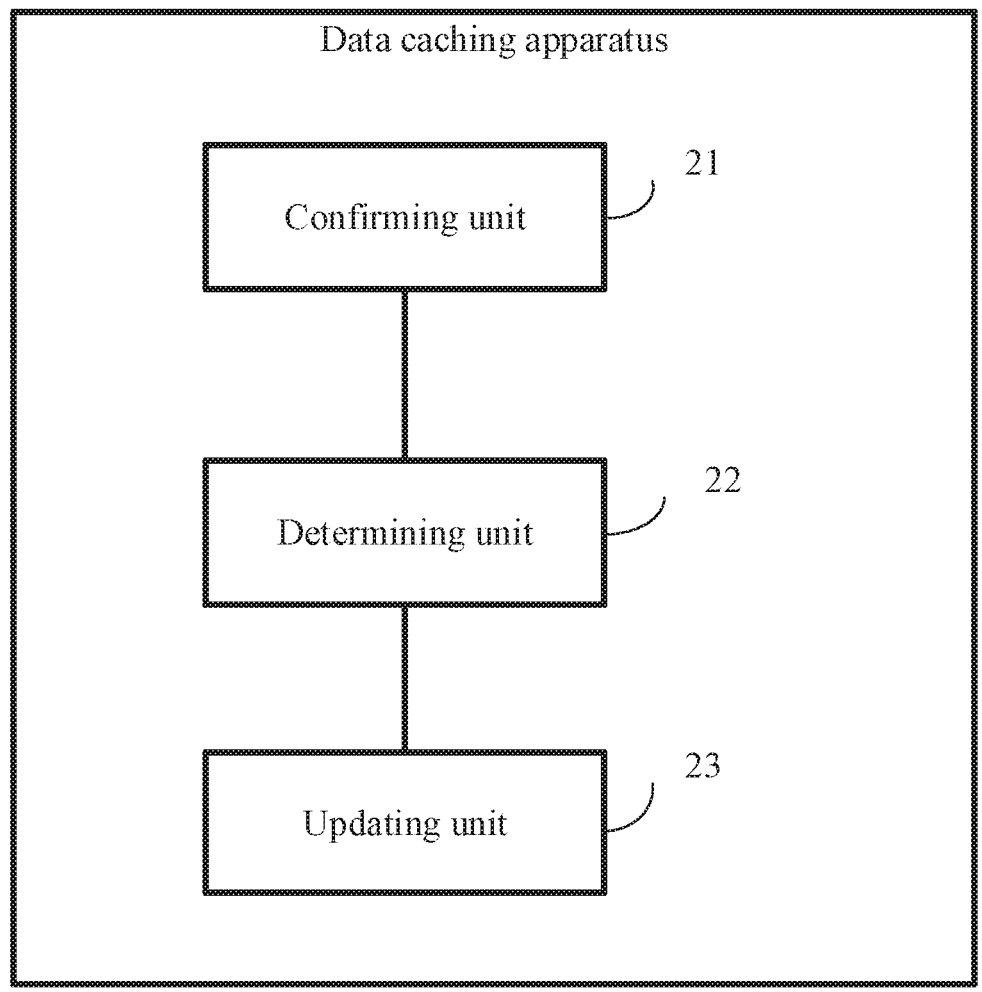
FIG. 2 is a block diagram of the composition of a data caching apparatus according to some embodiments of the present disclosure.

According to the above method embodiment, furthermore, another embodiment of the present disclosure also provides a data caching apparatus. As shown in FIG. 2, the apparatus mainly comprises: a confirming unit 21, a determining unit 22, and an updating unit 23, wherein:

the confirming unit 21 is configured to, after receiving a data request sent by a client, determine a remaining valid cache duration of cache data corresponding to the data request;

the determining unit 22 is configured to determine whether the remaining valid cache duration obtained by the confirming unit 21 is greater than a preset update threshold value; and the updating unit 23 is configured to, if a determination result of the determining unit 22 is that the remaining valid cache duration is less than or equal to the update threshold value, update the cache data through a database.

With the data caching apparatus according to some embodiments of the present disclosure, after a data request sent by a client is received, it can be determined whether a remaining valid cache duration of cache data corresponding to the data request is greater than a preset update threshold value; when the remaining valid cache duration is greater than the update threshold value, the cache data is directly returned to the client; and when the remaining valid cache duration is a positive number and less than or equal to the update threshold value, the cache data is returned to the client, and moreover, the cache data is updated through a database. Relative to current technologies where cache data is updated only when the cache data expires, therefore, the present system and method can update cache data before the cache data expires. When a great number of clients subsequently request the cache data, the cache data is still in a valid state, and the cache data can be directly returned to each of the clients, thereby mitigating the issue that a great number of requests access the database in parallel due to the expired cache data.

Figure 3:
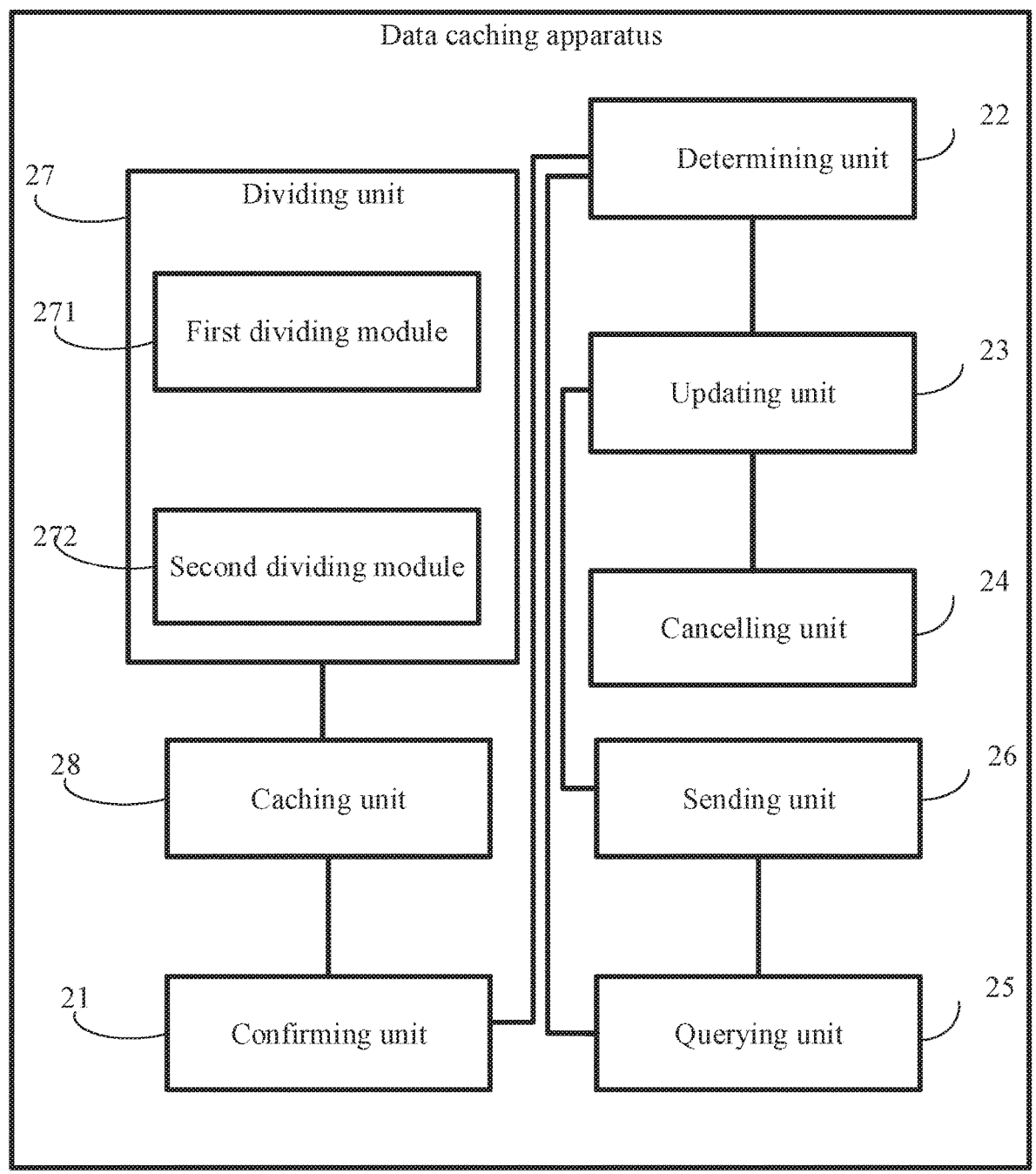
FIG. 3 is a block diagram of the composition of another data caching apparatus according to some embodiments of the present disclosure.

Furthermore, as shown in FIG. 3, the apparatus further comprises:

a cancelling unit 24 configured to, if another data request is received during an update period of the cache data, cancel the determination of whether the remaining valid cache duration is greater than the preset update threshold value.

Furthermore, as shown in FIG. 3, the apparatus further comprises:

a querying unit 25 configured to, when the cache data expires, check whether another data request sent by a client and corresponding to the cache data is received;

the updating unit 23 further configured to, when no data request sent by the client and corresponding to the cache data is received, update the cache data through the database;

a sending unit 26 configured to, if the another data request sent by the client and corresponding to the cache data is received, search the database for data corresponding to the data request, and return obtained data to the client; and the updating unit 23 further configured to update the cache data based on the obtained data.

Furthermore, as shown in FIG. 3, the apparatus further comprises:

a dividing unit 27 configured to, when a data resource is accessed for a first time, divide data comprised in the data resource into at least two data sets according to a resource type and a preset rule, wherein the access request is a request to access the data resource; and a caching unit 28 configured to separately cache each of the data sets obtained by the dividing unit 27 and generate a key corresponding to each of the data sets, for subsequently searching the cache data based on the keys, wherein each of the data sets has a different expiration time point.

Furthermore, as shown in FIG. 3, the dividing unit 27 comprises:

a first dividing module 271 configured to, when the data resource is a first page for presenting fixed data, divide the data comprised in the first page and obtained from the database into the at least two data sets according to the page layout of the first page;

a second dividing module 272 configured to, when the data resource is a second page having a condition query function, divide the data comprised in the second page and obtained from the database into the at least two data sets according to a combination of query conditions that the second page involves, wherein the second page comprises a plurality of sets of query conditions, result data corresponding to one set of query conditions is a data set, and each of the sets of query conditions comprises at least one query condition.

Furthermore, the determining unit 22 is configured to determine whether the remaining valid cache duration of a data set corresponding to a data request is greater than a update threshold value.

The apparatus embodiment corresponds to the above method embodiment. To facilitate reading, the apparatus embodiment does not repeat details in the above method embodiment one by one. The apparatus may correspond to all contents in the above method embodiment.

In some embodiments, the various modules and units of the data caching apparatus may be implemented as software instructions. That is, the data caching apparatus described with reference to FIG. 2 and FIG. 3 may comprise a processor and a non-transitory computer-readable storage medium storing instructions that, when executed by the processor, cause one or more components of the data caching apparatus (e.g., the processor) to perform various steps and methods of the modules and units described above. The data caching apparatus may also be referred to as a data caching system. In some embodiments, the data caching apparatus may include a mobile phone, a tablet computer, a PC, a laptop computer, a server, or another computing device.

In some embodiments, the data caching apparatus comprises a processor and a memory, the above confirming unit, determining unit, updating unit, and the like are all stored in the memory as program units, and corresponding functions are achieved by the processor though executing the above program units stored in the memory.

The processor comprises a core, and the core invokes a corresponding program unit in the memory. One or more cores may be provided, and the issue of having a large number of requests access the database in parallel due to cache expiration can be mitigated by adjusting core parameters.

The memory may include computer readable media, such as a volatile memory, a Random Access Memory (RAM), and/or a non-volatile memory, e.g., a Read-Only Memory (ROM) or a flash RAM. The memory comprises at least one memory chip.

The present disclosure further provides a computer program product configured to, when executed on a data processing device, execute initialization of program codes of the following method steps:

after receiving a data request sent by a client, determining a remaining valid cache duration of cache data corresponding to the data request;

determining whether the remaining valid cache duration is greater than a preset update threshold value, wherein the remaining valid cache duration is a positive number, and the update threshold value is less than the overall valid cache duration of the cache data; and if the remaining valid cache duration is less than or equal to the update threshold value, updating the cache data through a database.

The description of each of the above embodiments has a respective focus. Relevant descriptions in other embodiments may be referred to for any part that is not described in detail in one embodiment.

"First" and "second" in the above embodiments are used to differentiate the embodiments, rather than indicating advantages and disadvantages of the embodiments.

The algorithms and presentations provided herein are not inherently related to any particular computer, virtual system, or other apparatuses. Various general systems may also be used together with the teaching herein. A structure required to construct such system would become obvious with the description above. In addition, the present disclosure is not directed to any particular programming language. Various programming languages may be used to implement the content of the present disclosure described herein, and the description above for a particular language is intended to disclose a preferred implementation manner of the present disclosure.

Many exemplary details are described in the description. However, embodiments of the present disclosure can be implemented without these exemplary details. In some examples, known methods, structures, and technologies are not described in detail, so as not to confuse the understanding of the present disclosure.

Similarly, to simplify the present disclosure and help understand one or more of various inventive aspects, features of the present disclosure are sometimes grouped in a single embodiment or figure or a description of the single embodiment, figure in the above description of exemplary embodiments of the present disclosure.

Those skilled in the art should understand that modules in the apparatuses in one embodiment can be self-adaptively changed and arranged in one or more apparatuses different from the embodiment. Modules, units, or components in one embodiment can be combined into one module, unit, or component, and in addition, they can be divided into a plurality of sub-modules, sub-units, or sub-components. Except at least some mutual exclusions in such features and/or processes or units, all features disclosed in the description (including the accompanying claims, abstract and drawings), as well as all processes or units of any method or apparatus disclosed in such manner, can be combined in any combination. Each feature disclosed in the description (including the accompanying claims, abstract, and drawings) can be replaced by a substitute feature providing an identical, equivalent, or similar objective, unless otherwise explicitly stated.

In addition, those skilled in the art should understand that some embodiment described herein comprise some features, rather than other features, comprised in other embodiments, but a combination of features of different embodiments means that it falls within the scope of the present disclosure and different embodiments are formed. For example, in the appended claims, any one of the claimed embodiments can be used in any combination manner.

All component embodiments of the present disclosure can be implemented as hardware, software modules running on one or more processors, or a combination thereof. Those skilled in the art should understand that the present disclosure can be implemented as an apparatus or device program for executing some or all of the method described herein (e.g., a computer program and a computer program product). Such programs for implementing the present disclosure can be stored on a computer readable medium or may have a form of one or more signals. Such signals can be obtained by downloading from a website on the Internet, provided by a carrier signal, or provided in any other form. [88] The above embodiments are used to describe the present disclosure, instead of limiting the present disclosure. Moreover, those skilled in the art can design alternative embodiments without departing from the scope of the appended claims. In the claims, any reference symbols in parentheses shall not be used as limitations to the claims. The word "comprising" does not exclude elements or steps not listed in the claims. The word "one" or "one piece" in front of an element does not exclude the presence of a plurality of such elements. The present disclosure can be implemented by hardware comprising several different elements and a computer with proper programming. In a unit claim that lists several apparatuses, some of these apparatuses can be embodied through the same hardware item. The use of words like first, second, third, and the like does not indicate any sequence.

What is claimed is:

1. A data caching method, comprising:
dividing data from a data resource into at least two data sets according to a resource type of the data resource and a preset rule; and
separately caching each of the data sets and generating a key corresponding to each of the data sets for searching based on the keys, wherein each of the data sets has a different valid cache duration;
receiving a first data request for one of the cached data sets;
updating the cached data set responsive to receiving the first data request through a database;
receiving a second data request for the cached data set;
responsive to receiving the second data request:
determining whether the cached data set is being updated responsive to receiving the first data request;
if the cached data set is determined not being updated, determining a remaining valid cache duration of the cached data set and determining whether the remaining valid cache duration is greater than a preset update threshold value; and
when the remaining valid cache duration is determined to be less than or equal to the preset update threshold value, updating the cached data set through the database.

2. The method according to claim 1, further comprising:
when the cached data set expires, checking whether a third data request corresponding to the cached data set is received;
when no data request corresponding to the cached data set is received, updating the cached data set through the database; and
when the third data request corresponding to the cached data set is received, searching the database for data corresponding to the data request and updating the cached data set based on the searched data.

3. The method according to claim 1, wherein dividing the data into the at least two data sets according to the resource type and the preset rule comprises:
when the data resource is a first page for presenting fixed data, dividing the data comprised in the first page and obtained from the database into the at least two data sets according to a page layout of the first page.

4. The method according to claim 1, wherein dividing the data into the at least two data sets according to the resource type and the preset rule comprises:
when the data resource is a second page having a condition query function, dividing the data comprised in the second page and obtained from the database into the at least two data sets according to a combination of query conditions that the second page involves, wherein the second page comprises a plurality of sets of query conditions each comprising at least one query condition.

5. A data caching apparatus, comprising: a processor and a non-transitory computer-readable storage medium storing instructions that, when executed by the processor, cause the processor to perform a data caching method, the method comprising:
dividing data from a data resource into at least two data sets according to a resource type of the data resource and a preset rule; and
separately caching each of the data sets and generating a key corresponding to each of the data sets for searching based on the keys, wherein each of the data sets has a different valid cache duration;
receiving a first data request for one of the cached data sets;
updating the cached data set responsive to receiving the first data request through a database;
receiving a second data request for the cached data set;
responsive to receiving the second data request:
determining whether the cached data set is being updated responsive to receiving the first data request;
if the cached data set is determined not being updated, determining a remaining valid cache duration of the cached data set and determining whether the remaining valid cache duration is greater than a preset update threshold value; and when the remaining valid cache duration is determined to be less than or equal to the preset update threshold value, updating the cached data set through the database.

6. The apparatus according to claim 5, wherein the method further comprises:

when the cached data set expires, checking whether a third data request corresponding to the cached data set is received;

when no data request corresponding to the cached data set is received, updating the cached data set through the database; and when the third data request corresponding to the cached data set is received, searching the database for data corresponding to the data request and updating the cached data set based on the searched data.

7. The apparatus according to claim 5, wherein dividing the data comprised in the data resource into the at least two data sets according to the resource type and the preset rule comprises:

when the data resource is a first page for presenting fixed data, dividing the data comprised in the first page and obtained from the database into the at least two data sets according to a page layout of the first page.

8. The apparatus according to claim 5, wherein: dividing the data comprised in the data resource into the at least two data sets according to the resource type and the preset rule comprises:

when the data resource is a second page having a condition query function, dividing the data comprised in the second page and obtained from the database into the at least two data sets according to a combination of query conditions that the second page involves, wherein the second page comprises a plurality of sets of query conditions each comprising at least one query condition.

9. A non-transitory computer-readable storage medium storing instructions that, when executed by a processor, cause the processor to perform a data caching method, the method comprising:

dividing data from a data resource into at least two data sets according to a resource type of the data resource and a preset rule; and separately caching each of the data sets and generating a key corresponding to each of the data sets for searching based on the keys, wherein each of the data sets has a different valid cache duration;

receiving a first data request for one of the cached data sets;

updating the cached data set responsive to receiving the first data request through a database;

receiving a second data request for the cached data set;

responsive to receiving the second data request:

determining whether the cached data set is being updated responsive to receiving the first data request;

if the cached data set is determined not being updated, determining a remaining valid cache duration of the cached data set and determining whether the remaining valid cache duration is greater than a preset update threshold value; and when the remaining valid cache duration is determined to be less than or equal to the preset update threshold value, updating the cached data set through the database.

10. The non-transitory computer-readable storage medium according to claim 9, wherein the method further comprises:

when the cached data set expires, checking whether a third data request corresponding to the cached data set is received;

when no data request corresponding to the cached data set is received, updating the cached data set through the database; and when the third data request corresponding to the cached data set is received, searching the database for data corresponding to the data request and updating the cached data set based on the searched data.

11. The non-transitory computer-readable storage medium according to claim 9, wherein dividing the data comprised in the data resource into the at least two data sets according to the resource type and the preset rule comprises:

when the data resource is a first page for presenting fixed data, dividing the data comprised in the first page and obtained from the database into the at least two data sets according to a page layout of the first page.

12. The non-transitory computer-readable storage medium according to claim 9, wherein dividing the data comprised in the data resource into the at least two data sets according to the resource type and the preset rule comprises:

when the data resource is a second page having a condition query function, dividing the data comprised in the second page and obtained from the database into the at least two data sets according to a combination of query conditions that the second page involves, wherein the second page comprises a plurality of sets of query conditions each comprising at least one query condition.

* * * * *